United States Patent
Murakami et al.

[11] Patent Number: 6,159,249
[45] Date of Patent: Dec. 12, 2000

[54] DYE COMPOSITION AND METHOD FOR DYEING HYDROPHOBIC FIBER WITH THE SAME

[75] Inventors: Yasuo Murakami; Yoshiyuki Sato, both of Saitama; Tsuyoshi Kikkawa, Tokyo, all of Japan

[73] Assignee: Nippon Kayaku Kabushiki Kaisha, Tokyo, Japan

[21] Appl. No.: 09/284,891

[22] PCT Filed: Oct. 30, 1997

[86] PCT No.: PCT/JP97/03961

§ 371 Date: Apr. 22, 1999

§ 102(e) Date: Apr. 22, 1999

[87] PCT Pub. No.: WO98/20078

PCT Pub. Date: May 14, 1998

[30] Foreign Application Priority Data

Nov. 1, 1996 [JP] Japan ..................................... 8-305512

[51] Int. Cl.$^7$ ............................... D06P 3/87; C09B 67/38
[52] U.S. Cl. ........................... 8/52.9; 8/639; 8/643; 8/922
[58] Field of Search ............................... 8/529, 639, 638, 8/643, 922

[56] References Cited

U.S. PATENT DOCUMENTS

| | | |
|---|---|---|
| 4,405,330 | 9/1983 | Bergmann et al. ........................ 8/639 |
| 5,393,308 | 2/1995 | Lange et al. . |
| 5,569,309 | 10/1996 | Hihara et al. ............................... 8/639 |
| 5,744,588 | 4/1998 | Himeno et al. . |
| 5,868,802 | 2/1999 | Akatani et al. . |

FOREIGN PATENT DOCUMENTS

| | | |
|---|---|---|
| 3615202 | 11/1986 | Germany . |
| 58-80353 | 5/1983 | Japan . |
| 60-126387 | 7/1985 | Japan . |
| 62-212468 | 9/1987 | Japan . |
| 5-51539 | 3/1993 | Japan . |
| 7-242834 | 9/1995 | Japan . |
| 8-41371 | 2/1996 | Japan . |

*Primary Examiner*—Margaret Einsmann
*Attorney, Agent, or Firm*—Nields, Lemack & Dingman

[57] ABSTRACT

In the dyeing of hydrophobic fibers comprising new synthetic fibers, especially those called micronfine fibers, etc., it is difficult to obtain a dyed product having excellent fastness and it is further difficult to obtained a dyed product excellent also in color rendering. The present invention solved the problem as following:

A specific dye composition containing a water-insoluble monoazo disperse dye represented by a specific structural formula is used to dye hydrophobic fibers, especially polyester fibers, comprising micronfine fibers, thereby giving a dyed products excellent in fastness balance and color rendering.

15 Claims, No Drawings

DYE COMPOSITION AND METHOD FOR DYEING HYDROPHOBIC FIBER WITH THE SAME

TECHNICAL FIELD

The present invention relates to a dye composition and a method for dyeing with the same. More specifically, it relates to a dye composition containing a disperse dye having a specific structure suitable for dyeing hydrophobic fibers, especially polyester fibers, and a method for dyeing hydrophobic fibers with the same.

BACKGROUND OF THE INVENTION

Differentiated products that make use of characteristics provided by synthetic fibers which are generally termed new synthetic fibers are formed by composite finishing of original yarns having individual properties, such as micronfine fiber, modified cross-section yarns, blended filament yarns different in shrinkage and the like or by a combination thereof. The texture and the feeling peculiar to synthetic fibers which are not observed in natural fibers, in a silk-like fabric, a thin raised textured fabric (peach skin), a rayon-like fabric and the like, have been accepted, and they have been rapidly widened on the market.

However, in the dyeing of these composite materials, there are problems caused by microfine fibers. For example, the following problems tend to occur.

(1) A reflected light on a fiber surface is increased to decrease a visual density of a dyed product. Accordingly, in order to obtain the same surface density of the dyed product as that of the conventional product, a higher color value is required. (A color value is in parallel with a surface area.)

(2) A dyed product is liable to undergo oxidation and reduction with light, and a fastness to light of a dyed product is decreased.

(3) Due to (1), an amount of a dye used for a unit area is increased, so that a fastness to sublimation and a fastness to wetting of a dyed product are decreased.

(4) An unevenness (non-level dyeing) of a dyed product occurs owing to a difference in a thickness of composite fibers.

Further, finishing of a ceremonial dress, namely, a formal wear with a black dye is taken up as one of finishings which have been widely conducted in recent years. With respect to the dyeing in this field, a color of a dyed product has been required to be as deep black as possible, and various studies have been conducted. For example, there are improvements such as a method for modifying fibers themselves in which pores are formed in advance in a surface of a fiber, a finishing method in which a resin film having a low refractive index is formed on a surface of a fiber (darkening of a color) and the like, and the development of a new dye that gives a deep black color. With respect to the dye in these, it is required that a deep black color is given and a color deviation which is caused when a light source changes is low, that is, a so-called color rendering property is low.

In order to solve these problems, not only is it required to use a dye which is superior in a fastness and a build-up property, but also it is required to develop and use a dye which is excellent in a level dyeing property and a solid property of a fabric formed of composite yarns different in the thickness. Especially, for obtaining a dyed product with a dark blue or black color, a high build-up property is required, and a color value which is from 2 to 5 times that of a general color is needed. Besides, in a ceremonial dress, it has been considered good that a color of a dyed product is as deep as possible and a noble black color is given. Further, a change in color (color deviation) of a dyed product which is caused by change of a light source is termed a color rendering property. Generally, in a black dyed product, this color deviation tends to occur. In this instance, a change in color is problematic in many cases under a standard light source A typified by a tungsten light source to a color under a standard light source D65 or the like. The reason is that a relative spectral distribution of a blackbody such as a tungsten bulb or the like is extremely different to a standard light source D65 or the like, which results in a great change in color. For example, spotlights that are often used in hotels, wedding halls or the like are given by tungsten bulbs in many cases. When the spotlights are illuminated, a phenomenon occurs that a dress which must be dark black appears extremely reddish.

As a method for improving such a color deviation (color rendering property), a method for dyeing with a dye composition containing a compound which has absorption at from 650 to 800 nm is proposed in JP-A-Shou 62-246964, JP-A-Shou 62-246965, JP-A-Hei 5-18955, JP-A-Hei 1-28456 and the like. However, the so far developed compounds having absorption in the long wavelength (or near infrared) are not satisfactory with respect to both the effect of improving the color rendering property and the economics.

The present inventors have assiduously conducted investigations to solve the problems, and have consequently found that the problems are solved by conducting dyeing with a dye composition containing a disperse dye having a specific structure. This finding has led to the completion of the invention.

DISCLOSURE OF THE INVENTION

That is, the invention is:

(1) A dye composition containing a dye represented by formula (1) and a dye represented by formula (2).

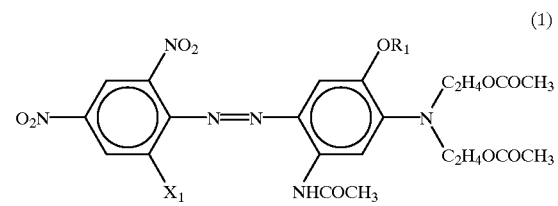

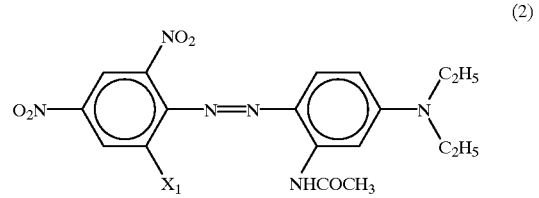

wherein $X_1$ represents a chlorine atom or a bromine atom, and $R_1$ represents a methyl group or an ethyl group.

(2) The dye composition recited in the (1), wherein the dye represented by formula (1) is contained in an amount of from 40 to 95% by weight, and the dye represented by formula (2) in an amount of from 60 to 5% by weight.

(3) The dye composition recited in the (1), which contains the dye represented by formula (1), the dye represented by formula (2), and a dye represented by formula (3)

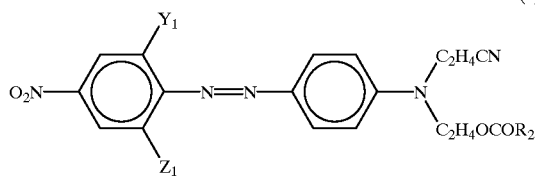

(3)

wherein $Y_1$ and $Z_1$, independently from each other, represent a chlorine atom or a bromine atom, and $R_2$ represents a methyl group or a phenyl group.

(4) The dye composition recited in the (3), wherein the dye represented by formula (1) is contained in an amount of from 40 to 90% by weight, the dye represented by formula (2) in an amount of from 60 to 5% by weight, and the dye represented by formula (3) in an amount of from 5 to 60% by weight.

(5) The dye composition of the (1) or (3), which contains, in addition to the dye represented by formula (1), the dye represented by formula (2) and the dye represented by formula (3), a dye represented by formula (4)

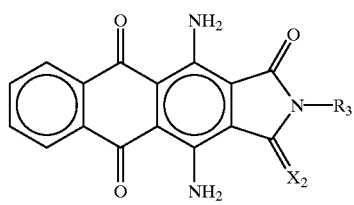

(4)

wherein $X_2$ represents an oxygen atom or an imino group, and $R_3$ represents an alkoxyalkyl group, an alkoxyalkoxyalkyl group, an alkoxycarbonylalkyl group or an alkyl group which may be branched, provided an alkyl group and an alkoxy group are groups having from 1 to 4 carbon atoms.

(6) The dye composition, wherein the dye represented by formula(1) is contained in an amount of from 40 to 90% by weight, the dye represented by formula (2) in an amount of from 60 to 5% by weight, the dye represented by formula (3) in an amount of from 2 to 70% by weight, and the dye represented by formula (4) in an amount of from 0.1 to 40% by weight.

(7) A method for dyeing a hydrophobic fiber, characterized by using the dye composition recited in the (1), (2), (3), (4), (5) or (6).

(8) A dyed product which is dyed with the dye composition containing the dye represented by formula (1) or (2).

(9) A dyed product which is dyed with the dye composition containing the dye represented by formula (1), (2) or (3).

(10) A dyed product which is dyed with the dye composition represented by formula (1), (2), (3) or (4).

(11) The dyed product of the (8) to (10), wherein the fastness to light, the fastness to sublimation, the fastness to water and the fastness to washing of the dyed product of the (8) to (10) are all grade 3 or higher.

(12) The dyed product of the (8) to (11), wherein the fastness to light, the fastness to sublimation, the fastness to water and the fastness to washing of the dyed product of the (8) to (11) are all grade 3 or higher, and the color rendering property thereof is grade 4 or 5.

(13) The dyed product of the (8) to (12) which is a hydrophobic fiber.

(14) The dyed product of the (13), wherein the hydrophobic fiber is a fiber containing micronfine fibers.

BEST MODE FOR CARRYING OUT THE INVENTION

The invention is described in detail below.

As stated above, as fibers become microfine, it is required to increase an amount of a dye for obtaining a dyed product having a high depth of shade, which invites the decrease in the fastness of the dyed product. Accordingly, a higher build-up property and a higher fastness than as usual is required for a dye to be used. Especially, in a blackish dark blue dyed product, an amount of a dye used is required to be from 2 to 5 times that of a dye with a general color. Almost no dye that can satisfy a fastness in microfine fibers has been seen. Further, in the dyeing of a composite material, especially a composite material obtained by using yarns of different deniers, even though the dyeing amounts of the microfine yarn side and the regular yarn side are the same, there is a problem that the unevenness (non-level dyeing) of a dyed product occurs owing to the decrease in the visual density of the microfine yarn side for the foregoing reason. Accordingly, an endurable high fastness is required for the microfine yarn side, and properties for which such a material can be dyed uniformly or with the solid color are also required. Further, as a method for obtaining a black dyed product, a method in which the dyeing is conducted mainly using dark blue disperse dyes represented by formula (1) is common. However, most of these dark blue dyes have the maximum absorption wavelength of from 560 to 620. As a result, there occurs a phenomenon that the color appears reddish under a light source in which the relative spectral distribution is inclined to the long wavelength side, such as the tungsten bulb. The inventors have discovered that the phenomenon that the color appears reddish can be improved much by using the dye composition containing the dark blue disperse dye of formula (1) and the dye represented by formula (2), or the dye composition containing, in addition to these dyes, the dye represented by formula(3), and as required, further the blue to green disperse dye represented by formula (4). When the hydrophobic fiber is dyed using the dye composition of the invention, the dyed product is obtained in which the color rendering property is extremely low, that is, the color deviation under different light sources is extremely low.

Further, it has been found that a dyed product having an excellent level dyeing property of a composite material of yarns of different deniers and a fastness which is by far superior to that of a conventional product is obtained by using a dye composition containing the dark blue and purple dyes represented by formulas (1) and (2), the orange dye represented by formula (3) and the specific blue to green dye represented by formula (4). This finding has led to the completion of the invention. When the composite material is dyed using the dye composition of the invention, a black dyed product which has quite a low unevenness (non-level dyeing) on the surface of the dyed product, which is extremely good in the fastnesses to light, sublimation and wetting, which is deep and which is excellent in the color rendering property is obtained.

The dye composition of the invention is prepared by containing the dye represented by formula (1) in an amount of preferably from 40 to 95% by weight, more preferably from 50 to 90% by weight, the dye represented by formula (2) in an amount of preferably from 60 to 5% by weight, more preferably from 50 to 10% by weight, the dye represented by formula (3) in an amount of preferably from 2 to 70% by weight, more preferably from 5 to 60% by weight, and the dye represented by formula (4) in an amount of preferably from 0.1 to 40% by weight, more preferably from 0.2 to 30% by weight.

And with respect to the dye represented by formula (1) and the dye represented by formula (2) in the dye composition of the invention, it is preferable that the dye represented by formula (1) is contained in an amount of from 40 to 95% by weight and the dye represented by formula (2) in an amount of from 60 to 5% by weight. Further, when the dye represented by formula (1), the dye represented by formula (2) and the dye represented by formula (3) are contained in the dye composition of the invention, it is preferable that the dye represented by formula (1) is contained in an amount of from 40 to 90% by weight, the dye represented by formula (2) in an amount of from 60 to 5% by weight and the dye represented by formula (3) in an amount of from 5 to 60% by weight. Still further, when the dye represented by formula (1), the dye represented by formula (2), the dye represented by formula (3) and the dye represented by formula (4) are contained in the dye composition of the invention, it is preferable that the dye represented by formula (1) is contained in an amount of from 40 to 90% by weight, the dye represented by formula (2) in an amount of from 60 to 5% by weight, the dye represented by formula (3) in an amount of from 2 to 70% by weight and the dye represented by formula (4) in an amount of from 0.1 to 40% by weight.

Incidentally, examples of the group represented by $R_3$ in formula (4) include the following. Examples of the alkoxyalkyl group having from 1 to 4 carbon atoms include a methoxypropyl group, an ethoxypropyl group, a propoxypropyl group, a butoxypropoxy group, a methoxyisopropyl group, an ethoxyisopropyl group, a methoxyethyl group, a methoxybutyl group, a methoxyisobutyl group, a butoxymethyl group and the like. A (C1–C2) alkoxypropyl or (C1–C2) alkoxyisopropyl group is preferable. Examples of the alkoxyalkoxyalkyl group include a methoxymethoxypropyl group, a methoxyethoxypropyl group, a methoxypropoxypropyl group, a methoxybutoxypropyl group, a methoxymethoxyisopropyl group, a methoxyethoxyisopropoxy group, an ethoxymethoxyethyl group, an ethoxymethoxybutyl group, a methoxymethoxyisobutyl group, a methoxybutoxymethyl group and the like. Examples of the alkoxycarbonylalkyl group include a methoxycarbonylpropyl group, an ethoxycarbonylpropyl group, a propoxycarbonylpropyl group, a butoxycarbonylpropoxy group, a methoxycarbonylisopropyl group, an ethoxycarbonylisopropyl group, a methoxycarbonylethyl group, a methoxycarbonylbutyl group, a methoxycarbonylisobutyl group, a butoxycarbonylmethyl group and the like. Examples of the alkyl group include a methyl group, an ethyl group, a propyl group, an isopropyl group, a butyl group, an isobutyl group and the like. Further, disperse dyes other than those of formulas (1), (2), (3) and (4) may be added according to a desired hue.

As a specific example of the disperse dye represented by formula (1), which is used in the invention, a compound of formula (1) in which when $X_1$ is Cl and $R_1$ is a methyl group or an ethyl group or a compound of formula (1) in which when $X_1$ is Br and $R_1$ is a methyl group or an ethyl group is mentioned. When preferable examples are represented by structural formulas, a compound of the following formula (5), (6) or (7) and the like are mentioned.

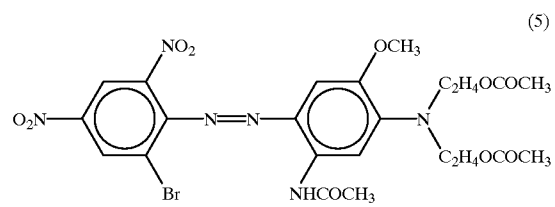

(5)

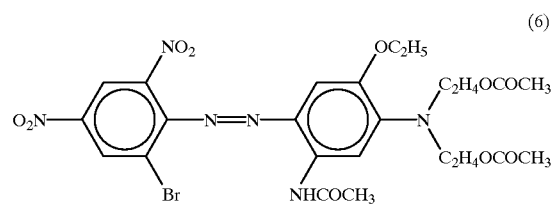

(6)

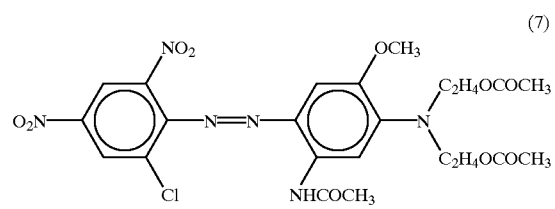

(7)

A mixture thereof is also available.

Further, as specific examples of the disperse dye represented by formula (2), a compound of the following formula (8) or (9) and the like are mentioned.

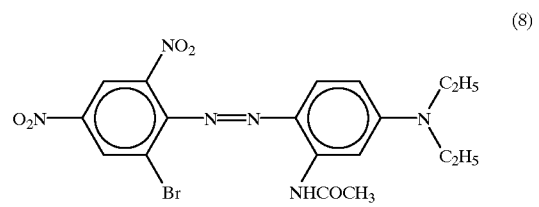

(8)

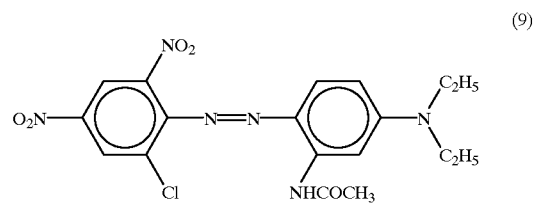

(9)

A mixture thereof is also available.

As a specific example of the disperse dye represented by formula (3), a compound in which $Y_1$ and $Z_1$ are chlorine atoms and $R_2$ is a methyl group or a phenyl group or a compound in which $Y_1$ and $Z_1$ are bromine atoms and $R_2$ is a methyl group or a phenyl group is mentioned. When preferable examples are represented by structural formulas, a compound of the following formula (10), (11) or (12) and the like are mentioned.

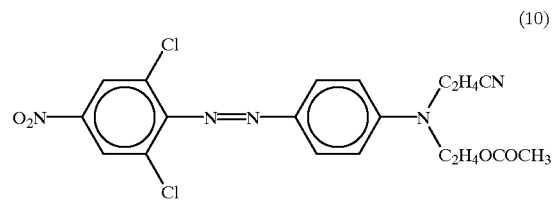

(10)

-continued

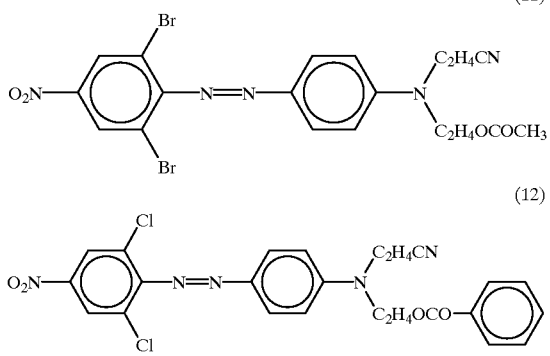

A mixture thereof is also available.

Further, as a preferable example of the disperse dye represented by formula (4), a compound in which $X_2$ is an oxygen atom or an imino group and R, is a (C1–C2) alkoxypropyl or (C1–C2) alkoxyisopropyl group can be mentioned. As specific examples thereof, a compound of the following formula (13), (14), (15) or (16) and the like are mentioned.

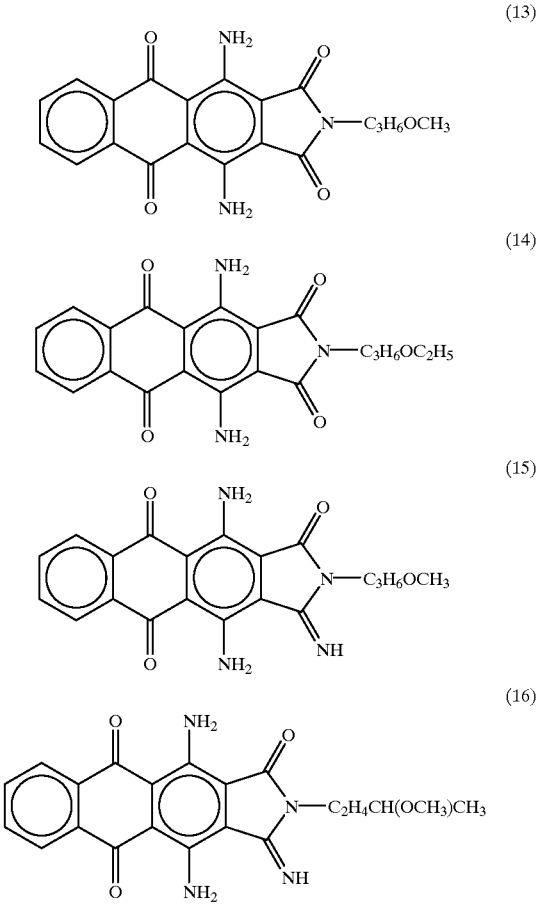

A mixture thereof is also available.

As dyes which are added according to a desired hue other than the dyes represented by formulas (1), (2), (3) and (4), disperse dyes such as a yellow dye, an orange dye, red to purple dyes and the like are mentioned, and these may be added unless qualities of the dye composition of the invention are impaired. As one of these dyes, a red dye represented by formula (22)

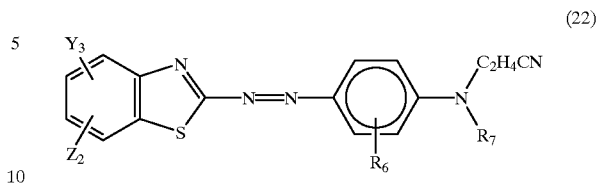

wherein $Y_3$ and $Z_2$, independently from each other, represent a nitro group or a halogen atom such as a chlorine atom, a bromine atom or the like, and $R_6$ and $R_7$, independently from each other, represent a hydrogen atom or a lower alkyl group having from 1 to 4 carbon atoms, such as a methyl group, an ethyl group or the like.

It is preferable that this dye is added when a black dye composition is obtained using the dye composition of the invention.

The powder of each dye(no dispersed dye) which is used in the invention is prepared in the following manner. The powder of the dye represented by formula (1) is a dye known from JP-B-Shou 39-14989 and the like or a disperse dye similar thereto. The powder of the dye represented by formula (2) is a dye known from JP-B-Shou 62-6592 and the like or a disperse dye similar thereto. The powder of the dye represented by formula (3) is a dye known from JP-B-Shou 36-16039 and the like or a disperse dye similar thereto. The powder of the dye represented by formula (4) is a dye known from JP-B-Shou 30-3384, JP-B-Shou 39-14992, JP-B-Shou 41-4872 and the like or a disperse dye similar thereto. These can easily be produced by the methods described therein or by the similar methods.

When the hydrophobic fiber is dyed with the dye compositions of the invention, these dye compositions are used in the dyeing in a state where they are wet pulverized and finely dispersed along with an ordinary dispersant. For example, an anionic dispersant such as a formalin condensate of naphthalenesulfonic acid, a formalin condensate of an alkylnaphthalenesulfonic acid, a formalin condensate of cresolsulfonic acid, lignin sulfonic acid or the like, a nonionic dispersant such as a block copolymer of ethylene oxide and propylene oxide, an ethylene oxide adduct of an alkylphenol, an ethylene oxide adduct of polystyrene phenol or the like, or a mixture of these anionic dispersants and nonionic dispersants (the dispersant is ordinarily used at a weight ratio of from 1 to 5 times relative to the powder) and a small amount of water are added to each of the powders of the dyes of formulas (1), (2), (3) and (4) or a mixture of these dye powders. The resulting blend is wet pulverized well usually to a size of from 0.2 to $1\mu$ using a mixing and grinding machine, a sand mill, a sand grinder or the like. The powder is subjected to the dyeing as such, as a paste, or as a finely divided dye of a dry product by being dried through spray drying or the like. When the dyes of formulas (1), (2), (3) and (4) are separately pulverized by the above-mentioned method, the finely divided dyes are mixed in advance or mixed in providing a dye bath to prepare the dye bath, and subjected to the dyeing.

Further, some types of existing disperse dyes can be used, besides the dyes represented by formulas (1), (2), (3) and (4) which are used in the invention, in order to adjust a hue to a desired one or further improve the fastness and the dyeability. At that time as well, the powders of the dyes may be mixed in advance and then pulverized, or the respective dyes are finely dispersed, then blended and subjected to the dyeing.

Specific examples of the hydrophobic fiber which can be dyed by the method of the invention include a polyester (PET) fiber, a polyamide fiber, a diacetate fiber, a triacetate fiber, and a blended product thereof. It may be a blended product with a regenerated fiber such as a rayon or the like, or a natural fiber such as cotton, silk, wool or the like. The thickness of the hydrophobic fiber is preferably between 0.1 and 10 d (denier). Especially, a fiber of from 0.1 to 1.0 d is called a micronfine fiber.

When the hydrophobic fiber is dyed using the dye composition of the invention, it is advantageous that the fiber is dyed in an aqueous solvent in which the dye is dipped at 105° C. or higher, preferably at from 110 to 140° C. under increased pressure. Further, it is also possible to conduct the dyeing in the presence of a carrier such as o-phenylphenol, chlorobenzene or the like at a relatively high temperature, for example, at a boiling temperature of a dye bath. Alternatively, it is also possible to conduct the dyeing by a so-called thermosol process in which the dye dispersion is padded on a fabric, and the resulting fabric is subjected to a dry heat treatment at from 150 to 230° C. for from 30 seconds to 1 minute.

Meanwhile, the dyeing may be conducted by a printing method in which a printing paste is prepared along with the dye composition of the invention and a natural paste (for example, locust bean gum or guar gum), a finish paste (for example, a cellulose derivative such as carboxymethyl cellulose or the like, or a finish locust bean gum), a synthetic paste (for example, polyvinyl alcohol or polyvinyl acetate), and a fabric is printed therewith, and then subjected to a steaming or thermosol treatment Further, the dyeing may be conducted by an ink jet printing method in which an ink is prepared by adding a non-drying agent such as glycerol, diethylene glycol or the like to the dye composition of the invention, a fabric to which a paste or the like has been applied through padding or the like is printed therewith using an ink jet-type printer, and the resulting fabric is then subjected to a steaming or thermosol treatment. When the dyeing is conducted using the dye composition of the invention, the amount of the dye composition used is optional. In the preferred embodiment, in case of, for example, a fiber of 3 denier, it is between 2 to 10% o.w.f. (based on the weight of the fiber).

In the above-obtained dyed product of the invention, the fastness to light, the fastness to sublimation, the fastness to water and the fastness to washing are grade 3 or higher, and the color rendering property is grade 4 or 5. Thus, it exhibits excellent properties with respect to the fastnesses and the color rendering property.

When the dyed product in the invention is a hydrophobic fiber, more preferably a polyester fiber and a polyacetate fiber and these fibers are fibers containing micronfine fibers, the outstanding effects are exhibited. However, the dyed product of the invention sometimes includes also a dyed product in a film, a molded product or the like other than the fiber. These dyed products may be obtained by usual methods used by practitioner having an ordinary skill in the art for dyeing a product to be dyed, such as, a dyeing method in a dye bath, an integral coloring method, a coating method and the like, as required.

The effects of the invention are described by referring to Tables 1 and 2.

Table 1 indicates the results of the dyeing with the dye compositions of the invention (compositions in Examples 1 to 10 to be described later) and comparative dye compositions (compositions in Comparative Examples 1 to 3 to be described later).

TABLE 1

Comparison on fastnesses of a micronfine fiber (0.3 d PET) (*1)

| | Light (*2) | Sublimation (*3) | Water (*4) | Washing (*5) |
|---|---|---|---|---|
| Example 1 | ○ | ○ | ○ | ○ |
| Example 2 | ○ | ○ | ○ | ○ |
| Example 3 | ○ | ○ | ○ | ○ |
| Example 4 | ○ | ○ | ○ | ○ |
| Example 5 | ○ | ○ | ○ | ○ |
| Example 6 | ○ | ○ | ○ | ○ |
| Example 7 | ○ | ○ | ○ | ○ |
| Example 8 | ○ | ○ | ○ | ○ |
| Example 9 | ○ | ○ | ○ | ○ |
| Example 10 | ○ | ○ | ○ | ○ |
| Comparative Example 1 | Δ | x | ○ | Δ |
| Comparative Example 2 | Δ | x | ○ | Δ |
| Comparative Example 3 | Δ | x | ○ | Δ |

(*1) A fabric (5.0 g) of a polyester microfine fiber of 0.3 denier was subjected to exhaustion dyeing under such dyeing conditions that each of the disperse dye compositions obtained in Examples 1 to 10 and Comparative Examples 1 to 3 was 20% (15% in Examples 1 to 10 and Comparative Example 1) o.w.f. (based on the weight of the fiber), the bath ratio 30:1, the pH 4.5, the temperature 130° C. and the time 60 minutes. The resulting dyed fabrics were subjected to the following fastness tests.
(*2) Test method for fastness to light: according to JIS L-0842 (carbon arc lamp). The degree of the fading in color practical standard, was rated as ◎, grade 2 to 3 as Δ, and grade less than 2 as x.
(*3) Test method for fastness to sublimation: according to JIS L-0879 B sublimination test (180° C., 30 seconds).
The degree of staining on a polyester white fabric was evaluated using the JIS staining gray scale. Grade 3 or higher, a practical standard, was rated as ◎, grade 2 to 3 as Δ, and grade less than 2 as x.
(*4) Test method for fastness to water: A dyed fabric was heat set at 180° C. for 30 seconds, and the test was then conducted according to the JIS L-0846 water test A method. The degree of staining on a nylon white fabric was evaluated using the JIS staining gray scale. Grade 3 or higher, a practical standard, was rated as ◎, grade 2 to 3 as Δ, and grade less than 2 as x.
(*5) Test method for fastness to washing: AATCC Test Method 61 II-A. The degree of staining on nylon was evaluated with the JIS staining gray scale. Grade 3 or higher, a practical standard, was rated as ◎, garde 2 to 3 as Δ, and grade less than 2 as x.

As shown in Table 1, it is found that the dyed product obtained with the dye composition of the invention is a microfine polyester of 0.3 denier and meets the practical levels with respect to the fastnesses to light, sublimation and wetting (water, washing), and the balance of the fastnesses is be very good. In Comparative Examples, some of the fastnesses to light, sublimation and wetting are found to be unsatisfactory.

Thus, the use of the dye composition of the invention can satisfy the fastnesses in the micronfine fiber which could not be satisfactory in the conventional dyeing method, and the dyed product which can fully satisfy the practical levels can be obtained.

Table 2 below show the results of conducting the test for the color rendering property using black dyed products obtained by conducting the dyeing with the dye compositions containing the dyes represented by formulas (1), (2), (3) and (4) as described in Invention Examples 7 to 10.

Table 2 below reveals that the dye compositions in Examples 7, 8, 9 and 10 give the dyed product quite a low color rendering property, namely quite a low color deviation under different light sources. Further, the color rendering property is found to be quite low in the dyed product after the deep dyeing.

TABLE 2

Test for color rendering property (*6)
Degree of deviation in color under two different light sources

| Dye composition | untreated | after deep dyeing (*7) |
| --- | --- | --- |
| Dye composition in Example 7 | 4–5 | 4–5 |
| Dye composition in Example 8 | 4–5 | 4–5 |
| Dye composition in Example 9 | 4–5 | 4–5 |
| Dye composition in Example 10 | 4–5 | 4–5 |

(*6) Dyeing method and test method for color rendering property: Three types of dye baths were prepared by adding pure water which had been adjustedto pH 4.5 to 10 parts by weight of the dye compositions obtained in Examples 7 to 10 to adjust the amount to 3,000 parts by weight. One hundred parts by weight of a polyester tropical fabric were dipped therein, and dyed at 130° C. for 60 minutes. Then, the dyed product was reductively washed at 80° C. for 10 minutes in a bath obtained by adding 6 parts by weight of 45% sodium hydroxide, 6 parts by weight of hydrosulfite and 3 parts by weight of Sunmorl RC-700 (supplied by Nikka Kagaku K.K., anionic surfactant) to pure water to adjust the total amount to 3,000 parts by weight. The resulting fabric was washed with water, and dried to obtained a black dyed fabric. The thus-obtained dyed fabrics were subjected to the test for the color rendering property. In the test for the color rendering property, the degree of the deviation in color under a commercial tungsten lamp (National Lamp PRF-500 W, supplied by Matsushite Electric Industrial Co., Ltd.) of a color temperature 5500K was visually evaluated using the JIS gray scale evaluation grades deviation in color with a color under illumination of a D65 standard light source prescribed by JIS as a standard.
(*7) Deep dyeing treatment and test for color rendering property: Each of the dyed fabrics obtained in the (*6) was padded with a solution containing 40 parts by weight of Schwat TR-420 (supplied by Kao Corporation, special resin finishing agent) and adjusted to a pH of 4 in a total amount of 1,000 parts by weight, intermediately dried, and then subjected to a dry heat treatment at 180° C. for 2 minutes. The resulting fabric was subjected to the same test for the color rendering property as in the (*6).

The invention is illustrated more specifically by referring to the following Examples. In Examples, parts and % are parts by weight and % by weight respectively.

EXAMPLE 1

Sixteen parts of the powder of the dye represented by formula (5) and 7 parts of the powder of the dye represented by formula (8) were pulverized (dispersed) along with 20 parts of Demol N (trade name; an anionic dispersant, supplied by Kao Corporation) and 57 parts of pure water using a sand grinder to obtain a liquid dye composition of the invention. A dye bath was prepared by adding pure water which had been adjusted to pH 4.5 to 15 parts of this dye composition to adjust the amount to 3,000 parts. One hundred parts of a fabric of a polyester microfine fiber of 0.3 denier were dipped therein, and dyed at 130° C. for 60 minutes. Then, the dyed fabric was reductively washed at 80° C. for 10 minutes in a bath prepared by adding water to 6 parts of 45% sodium hydroxide, 6 parts of hydrosulfite and 3 parts of Sunmor RC-700 (trade name; an anionic surfactant, supplied by Nikka Kagaku K.K.) to adjust the total amount to 3,000 parts. The fabric was washed with water, and dried to obtain a dark blue dyed fabric. The thus-obtained dyed fabric was quite excellent in all of fastnesses to light, sublimation and wetting.

EXAMPLE 2

The powder (14.7 parts) of the dye represented by formula (6) and 7.1 parts of the powder of the dye represented by formula (9) were pulverized (dispersed) along with 20 parts of Demol N and 58.2 parts of pure water using a sand grinder to obtain a liquid dye composition of the invention. A dye bath was prepared by adding pure water which had been adjusted to pH 4.5 to 15 parts of this dye composition to adjust the amount to 3,000 parts. One hundred parts of a fabric of a polyester microfine fiber of 0.3 denier were dipped therein, and dyed at 130° C. for 60 minutes. Then, the dyed fabric was reductively washed at 80° C. for 10 minutes in a bath prepared by adding water to 6 parts of 45% sodium hydroxide, 6 parts of hydrosulfite and 3 parts of Sunmor RC-700 to adjust the total amount to 3,000 parts. The fabric was washed with water, and dried to obtain a dark blue dyed fabric. The thus-obtained dyed fabric was quite excellent in all of fastnesses to light, sublimation, water and washing.

EXAMPLE 3

The powder (7.7 parts) of the dye represented by formula (5), 4 parts of the powder of the dye represented by formula (8) and 13 parts of the powder of the dye represented by formula (10) were pulverized (dispersed) along with 20 parts of Demol N and 55.3 parts of pure water using a sand grinder to obtain a liquid dye composition. A dye bath was prepared by adding pure water which had been adjusted to pH 4.5 to 20 parts of this dye composition to adjust the amount to 3,000 parts. One hundred parts of a fabric of a polyester microfine fiber having 0.3 denier were dipped therein, and dyed at 130° C. for 60 minutes. Then, the dyed fabric was reductively washed at 80° C. for 10 minutes in a bath prepared by adding water to 6 parts of 45% sodium hydroxide, 6 parts of hydrosulfite and 3 parts of Sunmor RC-700 to adjust the total amount to 3,000 parts. The fabric was washed with water, and dried to obtain a dark blue dyed fabric. The thus-obtained dyed fabric was quite excellent in all of fastnesses to light, sublimation and wetting.

EXAMPLE 4

The powder (8.1 parts) of the dye represented by formula (5), 3.5 parts of the powder of the dye represented by formula (8), 13 parts of the powder of the dye represented by formula (10) and 1.2 parts of a red dye represented by the following formula (17) were pulverized (dispersed) as in Example 3 to obtain a liquid dye composition of the invention. This was dyed similar to Example 3 to obtain a black dyed fabric. The resulting dyed fabric was quite excellent in all of fastnesses to light, sublimation and wetting.

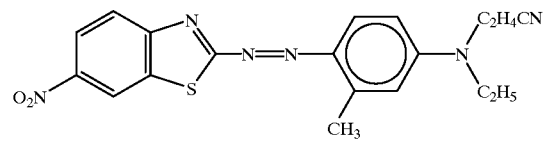

(17)

EXAMPLE 5

Eight parts of the powder of the dye represented by formula (7), 4 parts of the powder of the dye represented by formula (9), 13 parts of the powder of the dye represented by formula (11) and 1.5 parts of the red dye represented by formula (17) were pulverized (dispersed) as in Example 3 to obtain a liquid dye composition of the invention. This was dyed similar to Example 3 to obtain a black dyed fabric. The resulting dyed fabric was quite excellent in all of fastnesses to light, sublimation and wetting.

EXAMPLE 6

Eight parts of the powder of the dye represented by formula (7), 3.6 parts of the powder of the dye represented by formula (9), 12 parts of the powder of the dye represented by formula (12) and 1.2 parts of a red dye represented by the following formula (18) were pulverized (dispersed) as in Example 3 to obtain a liquid dye composition of the invention. This was dyed similar to Example 3 to obtain a black dyed fabric. The resulting dyed fabric was quite excellent in all of fastnesses to light, sublimation and wetting.

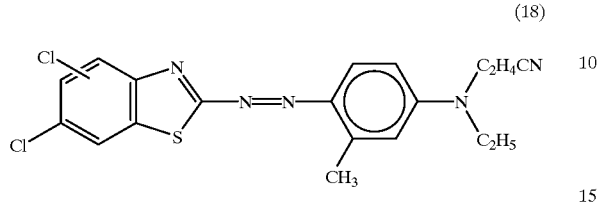

(18)

EXAMPLE 7

The powder (7.7 parts) of the dye represented by formula (5), 4 parts of the powder of the dye represented by formula (8), 13 parts of the powder of the dye represented by formula (9) and 1.2 parts of the powder of the dye represented by formula (13) were pulverized (dispersed) as in Example 3 to obtain a liquid dye composition of the invention. This was dyed similar to Example 3 to obtain a black dyed fabric. The resulting dyed fabric was quite excellent in all of fastnesses to light, sublimation and wetting and color rendering property.

EXAMPLE 8

The powder (8.1 parts) of the dye represented by formula (5), 3.5 parts of the powder of the dye represented by formula (8), 13 parts of the powder of the dye represented by formula (10) and 1.1 parts of the powder of the dye represented by formula (14) were pulverized (dispersed) as in Example 3 to obtain a liquid dye composition of the invention. This was dyed similar to Example 3 to obtain a black dyed fabric. The resulting dyed fabric was quite excellent in all of fastnesses to light, sublimation and wetting and color rendering property.

EXAMPLE 9

Eight parts of the powder of the dye represented by formula (7), 4.0 parts of the powder of the dye represented by formula (9), 13 parts of the powder of the dye represented by formula (13) and 1. 0 part of the powder of the dye represented by formula (15) were pulverized (dispersed) as in Example 3 to obtain a liquid dye composition of the invention. This was dyed similar to Example 3 to obtain a black dyed fabric. The resulting dyed fabric was quite excellent in all of fastnesses to light, sublimation and wetting and color rendering property.

EXAMPLE 10

Eight parts of the powder of the dye represented by formula (7), 3.6 parts of the powder of the dye represented by formula (9), 12 parts of the powder of the dye represented by formula (12) and 1.0 part of the powder of the dye represented by formula (16) were pulverized (dispersed) as in Example 3 to obtain a liquid dye composition. This was dyed similar to Example 3 to obtain a black dyed fabric. The resulting dyed fabric was quite excellent in all of fastnesses to light, sublimation and wetting and color rendering property.

COMPARATIVE EXAMPLE 1 to 3

Liquid dye compositions for comparison with the dye compositions of the invention were prepared in the same manner as in Examples except that a dye represented by the following formula (19) was used instead of the dark blue to purple dyes of formulas (1) and (2), a dye represented by the following formula (20) instead of the orange dye of formula (3) and a dye represented by the following formula (21) instead of the blue to green dye of formula (4).

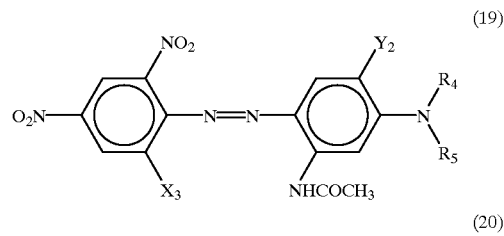

(19)

(20)

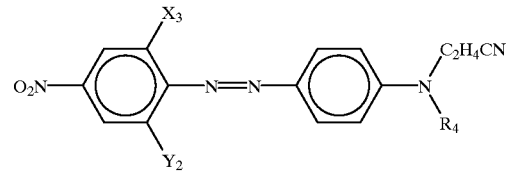

(21)

At that time, as dye compositions used for blending, disperse dyes prepared in a usual manner in which substituents $X_3$, $Y_2$, $R_4$ and $R_5$ in formulas (19), (20) and (21) were as shown in Table 3 below were used in amounts shown in Table 4 below. In the table, the amounts of the powder of the dye, the dye for color adjustment, the dispersant and water were indicated in terms of parts by weight.

TABLE 3

$X_3$, $Y_2$, $R_4$ and $R_5$ in formulas (19), (20) and (21)

|  |  | Formula | $X_3$ | $Y_2$ | $R_4$ | $R_5$ |
|---|---|---|---|---|---|---|
| Example 1 | a | 19 | Br | OMe | $C_2H_4OCOMe$ | $C_2H_4OCOMe$ |
|  | b | 19 | Br | H | Et | Et |
| Example 2 | a | 19 | Br | OEt | $C_2H_4OCOMe$ | $C_2H_4OCOMe$ |
|  | b | 19 | Cl | H | Et | Et |
| Example 3 | a | 19 | Br | OMe | $C_2H_4OCOMe$ | $C_2H_4OCOMe$ |
|  | b | 19 | Br | H | Et | Et |
|  | c | 20 | Cl | Cl | $C_2H_4OCOMe$ | — |
| Example 4 | a | 19 | Br | OMe | $C_2H_4OCOMe$ | $C_2H_4OCOMe$ |
|  | b | 19 | Br | H | Et | Et |
|  | c | 20 | Cl | Cl | $C_2H_4OCOMe$ | — |
| Example 5 | a | 19 | Cl | OMe | $C_2H_4OCOMe$ | $C_2H_4OCOMe$ |
|  | b | 19 | Cl | H | Et | Et |
|  | c | 20 | Br | Br | $C_2H_4OCOMe$ | — |
| Example 6 | a | 19 | Cl | OMe | $C_2H_4OCOMe$ | $C_2H_4OCOMe$ |
|  | b | 19 | Cl | H | Et | Et |
|  | c | 20 | Cl | Cl | $C_2H_4OCOPh$ | — |
| Example 7 | a | 19 | Br | OMe | $C_2H_4OCOMe$ | $C_2H_4OCOMe$ |
|  | b | 19 | Br | H | Et | Et |
|  | c | 20 | Cl | Cl | $C_2H_4OCOMe$ | — |
|  | d | 21 | O | — | $C_3H_6OMe$ | — |
| Example 8 | a | 19 | Br | OMe | $C_2H_4OCOMe$ | $C_2H_4OCOMe$ |
|  | b | 19 | Br | H | Et | Et |
|  | c | 20 | Cl | C | $C_2H_4OCOMe$ | — |
|  | d | 21 | O | — | $C_3H_6OEt$ | — |

TABLE 3-continued

$X_3$, $Y_2$, $R_4$ and $R_5$ in formulas (19), (20) and (21)

| | Formula | $X_3$ | $Y_2$ | $R_4$ | $R_5$ |
|---|---|---|---|---|---|
| Example 9 | a | 19 | Cl | OMe | $C_2H_4OCOMe$ | $C_2H_4OCOMe$ |
| | b | 19 | Cl | H | Et | Et |
| | c | 20 | Br | Br | $C_2H_4OCOMe$ | — |
| | d | 21 | NH | — | $C_3H_6OMe$ | — |
| Example 10 | a | 19 | Cl | OMe | $C_2H_4OCOMe$ | $C_2H_4OCOMe$ |
| | b | 19 | Cl | H | Et | Et |
| | c | 20 | Cl | Cl | $C_2H_4OCOMe$ | — |
| | d | 21 | NH | — | $C_2H_4(OMe)Me$ | — |
| Comparative Example 1 | a | 19 | Br | OMe | Et | Et |
| | b | 19 | Br | H | Et | Et |
| Comparative Example 2 | a | 19 | Br | OMe | Et | Et |
| | b | 19 | Br | H | Et | Et |
| | c | 20 | Cl | Cl | $C_2H_4OCOMe$ | — |
| Comparative Example 3 | a | 19 | Br | OMe | Et | Et |
| | b | 19 | Br | H | Et | Et |
| | c | 20 | Cl | Cl | $C_2H_4OCOMe$ | — |

*8) In Table 3 above, Me means a methyl group, Et an ethyl group, and Ph a phenyl group.

TABLE 4

Formulation of a dye composition

| | | Amount of an powder of a dye | Dye for color adjustment | Dispersant | Pure water |
|---|---|---|---|---|---|
| Example 1 | a | 16.0 | — | 20 | 57.0 |
| | b | 7.0 | | | |
| Example 2 | a | 14.7 | — | 20 | 58.2 |
| | b | 7.1 | | | |
| Example 3 | a | 7.7 | — | 20 | 55.3 |
| | b | 4.0 | | | |
| | c | 13.0 | | | |
| Example 4 | a | 8.1 | 1.2 | 20 | 54.2 |
| | b | 3.5 | (*9) | | |
| | c | 13.0 | | | |
| Example 5 | a | 8.0 | 1.5 | 20 | 53.5 |
| | b | 4.0 | (*9) | | |
| | c | 13.0 | | | |
| Examplee | a | 8.0 | 1.2 | 20 | 55.2 |
| | b | 3.6 | (*10) | | |
| | c | 12.0 | | | |
| Example 7 | a | 7.7 | — | 20 | 54.1 |
| | b | 4.0 | | | |
| | c | 13.0 | | | |
| | d | 1.2 | | | |
| Example 8 | a | 8.1 | — | 20 | 54.3 |
| | b | 3.5 | | | |
| | c | 13.0 | | | |
| | d | 1.1 | | | |
| Example 9 | a | 8.0 | — | 20 | 54.0 |
| | b | 4.0 | | | |
| | c | 13.0 | | | |
| | d | 1.0 | | | |
| Example 10 | a | 8.0 | — | 20 | 55.4 |
| | b | 3.6 | | | |
| | c | 12.0 | | | |
| | d | 1.0 | | | |
| Comparative Example 1 | a | 15.4 | — | 20 | 58.0 |
| | b | 6.6 | | | |
| Comparative Example 2 | a | 6.0 | — | 20 | 58.0 |
| | b | 3.5 | | | |
| | c | 12.5 | | | |
| Comparative Example 3 | a | 8.0 | 1.5 | 20 | 55.3 |
| | b | 3.4 | (*9) | | |
| | c | 11.8 | | | |

*9) using the red dye represented by formula (17).

INDUSTRIAL APPLICABILITY

A dyed product which is quite good in balance of fastnesses to light, sublimation and wetting and which is excellent in color rendering property can be obtained by using the dye composition of the invention when dyeing a composite material of a hydrophobic fiber containing a microfine synthetic fiber called a micronfine fiber or the like. Thus, it is extremely valuable in the dyeing industry.

What is claimed is:

1. A black dye composition containing a dye represented by formula (1):

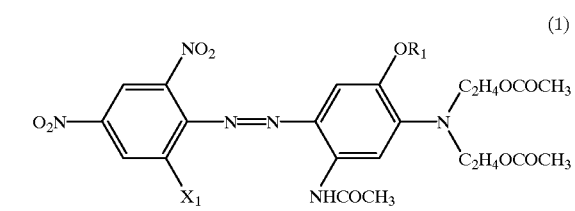

(1)

a dye represented by formula (2):

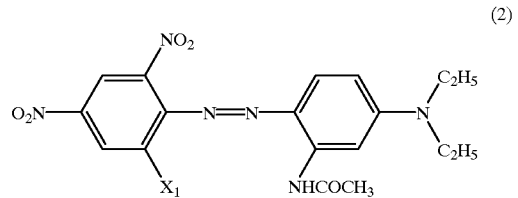

(2)

wherein $X_1$ represents a chlorine atom or a bromine atom and $R_1$ represents a methyl group or an ethyl group, and a dye represented by formula (3):

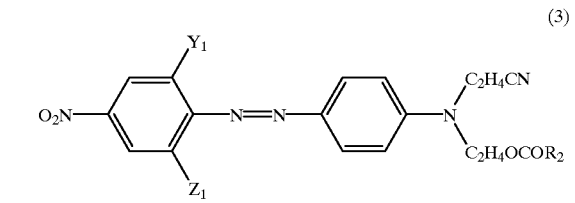

(3)

wherein $Y_1$ and $Z_1$, independently from each other, represent a chlorine atom or a bromine atom, and $R_2$ represents a methyl group or a phenyl group.

2. The black dye composition recited in claim 1, wherein the dye represented by formula (1) is contained in an amount of from 40 to 90% by weight, the dye represented by formula (2) in an amount of from 60 to 5% by weight, and the dye represented by formula (3) in an amount of from 5 to 60% by weight.

3. A black dye composition containing a dye represented by formula (1):

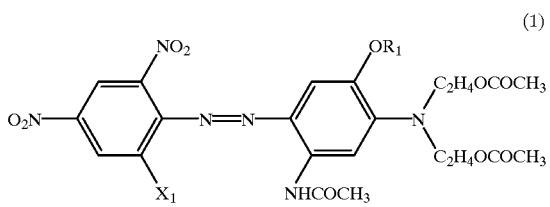

(1)

a dye represented by formula (2):

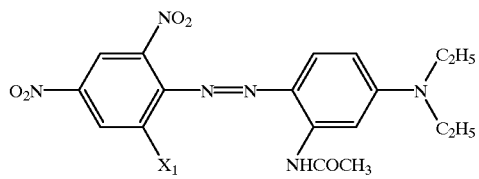

(2)

wherein $X_1$ represents a chlorine atom or a bromine atom and $R_1$ represents a methyl group or an ethyl group, a dye represented by formula (3):

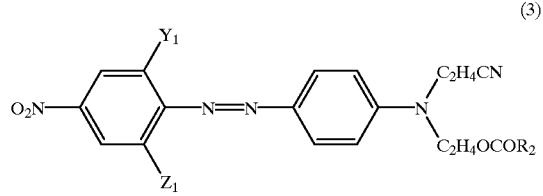

(3)

wherein $Y_1$ and $Z_1$, independently from each other, represent a chlorine atom or a bromine atom, and $R_2$ represents a methyl group or a phenyl group, and a dye represented by formula (4):

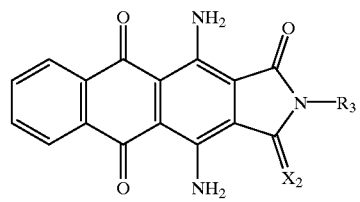

(4)

wherein $X_2$ represents an oxygen atom or an imino group, and $R_3$ represents an alkoxyalkyl group, an alkoxyalkoxyalkyl group, and alkoxycarbonylalkyl group or an alkyl group which may be branched, provided an alkyl group and an alkoxy group are groups having from 1 to 4 carbon atoms.

4. The black dye composition recited in claim 3, wherein the dye represented by formula (1) is contained in an amount of from 40 to 90% by weight, the dye represented by formula (2) in an amount of from 60 to 5% by weight, the dye represented by formula (3) in an amount of from 2 to 70% by weight, and the dye represented by formula (4) in an amount of from 0.1 to 40% by weight.

5. A method for dyeing a hydrophobic fiber, characterized by using the black dye composition recited in claim 1, 2, 3 or 4.

6. A dyed product which is dyed with a black dye composition containing a dye represented by formula (1):

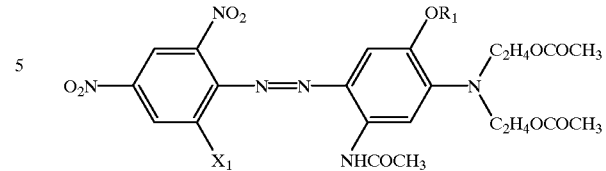

(1)

a dye represented by formula (2):

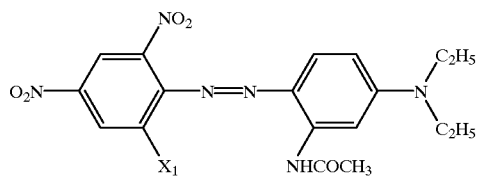

(2)

wherein $X_1$ represents a chlorine atom or a bromine atom, $R_1$ represents a methyl group or an ethyl group, and a dye represented by formula (3):

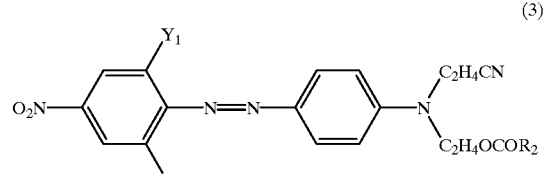

(3)

wherein $Y_1$ and $Z_1$, independently from each other, represent a chlorine atom or a bromine atom, and $R_2$ represents a methyl group or a phenyl group.

7. A dyed product which is dyed with a black dye composition containing a dye represented by formula (1):

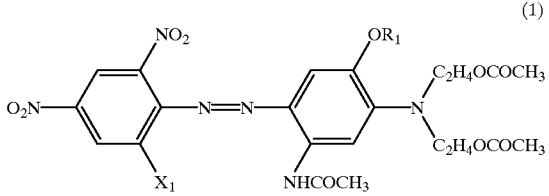

(1)

a dye represented by formula (2):

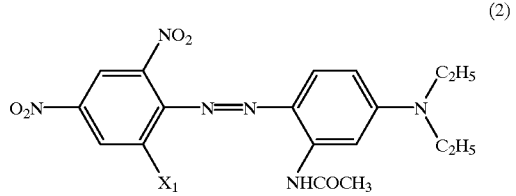

(2)

wherein $X_1$ represents a chlorine atom or a bromine atom, $R_1$ represents a methyl group or an ethyl group, a dye represented by formula (3):

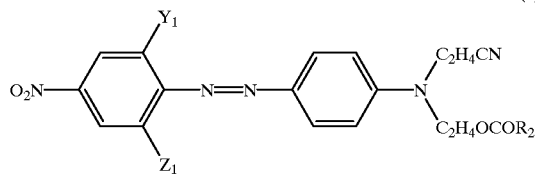
(3)

wherein $Y_1$ and $Z_1$, independently from each other, represent a chlorine atom or a bromine atom, and $R_2$ represents a methyl group or a phenyl group, and a dye represented by formula (4):

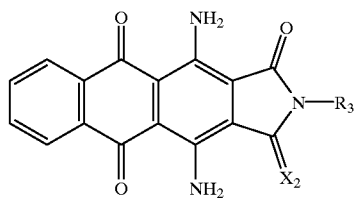
(4)

wherein $X_2$ represents an oxygen atom or an imino group, and $R_3$ represents an alkoxyalkyl group, an alkoxyalkoxyalkyl group, and alkoxycarbonylalkyl group or an alkyl group which may be branched, provided an alkyl group and an alkoxy group are groups having from 1 to 4 carbon atoms.

8. The dyed product of claim 6 or 7, wherein the fastness to light, the fastness to sublimation, the fastness to water and the fastness to washing of the dyed product of claim 6 or 7 are all grade 3 or higher.

9. The dyed product of claim 6 or 7, wherein the color rendering property of the dyed product of claim 6 or 7 is grade 4 or 5.

10. The dyed product of claim 6 or 7 which is a hydrophobic fiber.

11. The dyed product of claim 10, wherein the hydrophobic fiber is a micronfine fiber.

12. The dyed product of 8, wherein the color rendering property of the dyed product of claim 11 is grade 4 or 5.

13. The dyed product of claim 8 which is a hydrophobic fiber.

14. The dyed product of claim 9 which is a hydrophobic fiber.

15. The dyed product of claim 12 which is a hydrophobic fiber.

* * * * *